US012412172B1

(12) United States Patent
Edwards et al.

(10) Patent No.: US 12,412,172 B1
(45) Date of Patent: Sep. 9, 2025

(54) SECURED THIRD-PARTY WALLET ENVIRONMENT

(71) Applicant: Gemini IP, LLC, New York, NY (US)

(72) Inventors: Alex Edwards, Portland, OR (US); Jessica Destefano, Denver, CO (US); Christopher Karabats, Round Rock, TX (US); Mitchell McCuiston, Prosper, TX (US); Ioannis Papapanagiotou, San Jose, CA (US); Enrique Valenzuela, Chantilly, VA (US); Ahmad Wilson, Sandy Springs, GA (US); Emirhan Akkaya, Garden City, NY (US); Elaine Huang, Campbell, CA (US)

(73) Assignee: Gemini IP, LLC, New York, NY (US)

( * ) Notice: Subject to any disclaimer, the term of this patent is extended or adjusted under 35 U.S.C. 154(b) by 267 days.

(21) Appl. No.: 18/097,976

(22) Filed: Jan. 17, 2023

(51) Int. Cl.
*G06Q 20/38* (2012.01)
*G06Q 20/06* (2012.01)
*G06Q 20/36* (2012.01)

(52) U.S. Cl.
CPC ....... *G06Q 20/3829* (2013.01); *G06Q 20/065* (2013.01); *G06Q 20/3674* (2013.01)

(58) Field of Classification Search
CPC ............. G06Q 20/3829; G06Q 20/065; G06Q 20/3674
See application file for complete search history.

(56) References Cited

U.S. PATENT DOCUMENTS

| 10,558,963 B2 * | 2/2020 | Desai ................. G06Q 20/3223 |
| 2012/0222134 A1 * | 8/2012 | Orsini ................... G06F 21/606 726/28 |
| 2022/0075886 A1 * | 3/2022 | Kasi ...................... G06F 16/164 |
| 2022/0179843 A1 * | 6/2022 | Irazabal .............. G06F 16/2379 |

OTHER PUBLICATIONS

Distributed Ledger Interaction Systems and Methods (Year: 2021).*

* cited by examiner

*Primary Examiner* — Patrick McAtee
*Assistant Examiner* — Nakia Leffall-Allen
(74) *Attorney, Agent, or Firm* — Lee & Hayes, P.C.

(57) ABSTRACT

Systems and methods for providing users access to trusted custody and/or staking services for newly launched blockchain projects and/or their associated cryptocurrencies are described herein. For example, a host server including a system may send, receive, and stake cryptocurrency in a secure environment where the host server manages private keys associated with one or more wallets. In some cases, the host server may utilize an abstraction layer to translate user requests into commands that may be communicated to a third-party server associated with the blockchain and/or cryptocurrencies. The user requests may include actions associated with cryptocurrencies, such as checking a wallet address, generating new wallet, transferring cryptocurrency, and/or staking cryptocurrency.

16 Claims, 8 Drawing Sheets

500

```
RECEIVE, FROM A USER, A REQUEST TO STORE CRYPTOCURRENCY
DATA ON A FIRST SERVER
502
```

```
DETERMINE, AT AN ABSTRACTION LAYER, A CORRESPONDING ACTION
ASSOCIATED WITH THE REQUEST
504
```

```
GENERATE A COMMAND IN A COMMAND LINE INTERFACE BASED AT
LEAST IN PART ON THE CORRESPONDING ACTION
506
```

```
CONNECT, VIA AN INTEGRATION, TO A SECOND SERVER ASSOCIATED
WITH THE CRYPTOCURRENCY COIN
508
```

```
INITIATE, AT THE COMMAND LINE INTERFACE, THE COMMAND
510
```

```
RECEIVE, FROM THE SECOND SERVER AND BASED AT LEAST IN PART ON
INITIATING THE COMMAND, CLIENT DATA ASSOCIATED WITH AT LEAST
ONE OF THE USER OR THE CRYPTOCURRENCY COIN
512
```

FIG. 5

SECURED THIRD-PARTY WALLET ENVIRONMENT

BACKGROUND

Exchange platforms provide retail and institutional customers the ability to securely store and access cryptocurrency via wallets and their respective key pairs. Given the complexity of back-end infrastructure, it can take extensive amounts of time (e.g., 6-12 months) for the exchange platform to add support for a new blockchain network when a new cryptocurrency is created. This constraint limits the ability of the exchange platform to quickly on-board new cryptocurrencies and their respective blockchain data which, in turn, results in the creator of the new cryptocurrency and new blockchain network having to store sensitive data (e.g., security keys) in a less secure environment, such as a laptop or web browser. Described herein are improvements in technology and solutions to technical problems that can be used to, among other things, create and securely store wallets for cryptocurrencies not available on an exchange platform.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 illustrates another flow diagram of an example process for accessing client data as described herein.

DETAILED DESCRIPTION

Figure 1:
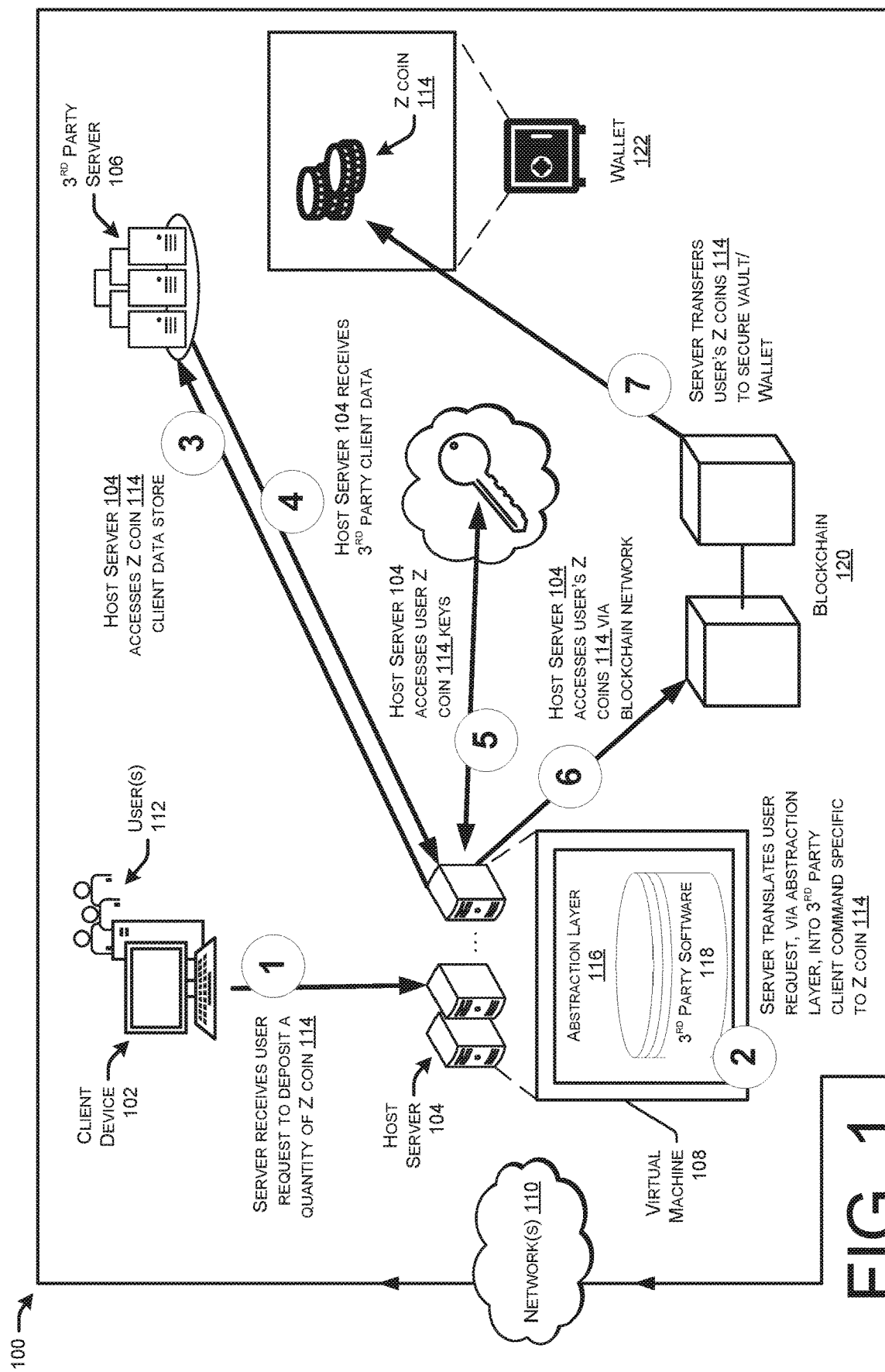
FIG. 1 illustrates a schematic diagram of an example environment for accessing client data from a third-party server.

Systems and methods for providing users access to trusted custody and/or staking services for newly launched blockchain projects and/or their associated cryptocurrencies are described herein. For example, an exchange platform including a system may send, receive, and stake cryptocurrency in a secure environment where the exchange platform stores and manages private keys associated with one or more wallets. The cryptocurrency industry is rapidly developing, and new blockchain networks and new cryptocurrencies emerge daily. Users, such as investors, seeking exposure to these projects find it crucial to have the appropriate wallet infrastructure to safely store and manage new cryptocurrency assets. However, the rapid pace of new cryptocurrency and blockchain networks can leave users without good custody options at the launch of a new network. This constraint forces creators of the new network and/or their investors to internally manage the wallet infrastructure for new cryptocurrency, including storing private keys, cryptocurrency data, blockchain data, and/or client data on third-party servers that do not provide standard services concerning cryptocurrencies (e.g., sending, receiving, staking, etc.). Further, organizations that need to manage their own private keys can create several points of failure. They can be lost, malformed, stolen, or even exploited from internal employees. Therefore, these organizations and/or their investors need a robust and reliable system to safely store and manage nascent cryptocurrencies to protect their investments. The exchange platform discussed herein enables generation of a wallet infrastructure on a blockchain network within a short period of time (e.g., 1-3 weeks) and eliminates the burdens of managing and providing security for private keys for organizations and/or their associated investors.

In some cases, the exchange platform (sometimes referred to herein as the "system") may receive a request from a user indicating an action with respect to a cryptocurrency coin. As mentioned above, the cryptocurrency coin may be a newly generated cryptocurrency with a newly created blockchain environment and the user may be an investor in the organization that generated the new blockchain and/or the user may be a member of the organization itself. In some examples, at the time the system receives the request, private key data, cryptocurrency data (e.g., the cryptocurrency coins), blockchain data, and/or client data may be stored on third-party server(s). In some cases, the user may access an application programming interface (API) to send requests and/or other data to the system. For example, the system may receive (e.g., via the API and from the user) a request for a wallet address, a request to transfer cryptocurrency (e.g., send or receive cryptocurrency), a request to generate a new wallet, and/or a request to stake cryptocurrency (e.g., broadcast a smart contract call). In some cases, the request options may include predefined options for selection by the user and may present other selectable options based on which request option is selected by the user. For example, if the user selects to transfer cryptocurrency, an option may be presented to input a wallet address to be associated with the transfer.

In some examples, once the request is received from the user, the system may determine, at an abstraction layer, a corresponding action associated with the predefined request. For example, the abstraction layer may operate on-top of any software accessed and/or utilized by a third-party server. For instance, processes, such as key generation, may be performed by third-party software (e.g., untrusted third-party wallet software) used to store and grant access to client data (e.g., cryptocurrency data, blockchain data, etc.). The data format of the request received from the user may not be compatible with the software operated by the third-party server that stores the data related to the request (e.g., private key data, cryptocurrency data (e.g., the cryptocurrency coins), blockchain data, client data, etc.). Using the abstraction layer, the system can operate and/or otherwise have access to the software of the third-party servers in a secured environment, as opposed to relying on new software to execute the user request. Without the need for extensive amounts of new software to execute the user request, the system is able to execute the user request in a significantly shorter amount of time than previously disclosed systems.

In some cases, the user request may include a request for a wallet address, a request to transfer cryptocurrency (e.g., send or receive cryptocurrency), a request to generate a new wallet, and/or a request to stake cryptocurrency. The corresponding action determined at the abstraction layer may be different for each type of request. For example, if the user request is to transfer cryptocurrency, then the determined corresponding action may include obtaining access keys to a wallet associated with the user in order to access the cryptocurrency to be transferred. If the user request is to generate a new wallet, the corresponding action may include establishing a connection with the third-party server storing the client data and/or cryptocurrency associated with the user. If the user request is to stake cryptocurrency, the corresponding action may include broadcasting a smart contract call. The corresponding actions may not be limited to those listed above and, in some cases, may be a combination of actions listed. For example, the system may obtain access keys to a wallet associated with the user regardless of what the user request may include.

In some cases, the system may generate a command in a command line interface (CLI) based on the corresponding action. For example, once the corresponding action is determined, (e.g., obtaining access keys to a wallet associated with the user in order to access the cryptocurrency to be transferred, establishing a connection with the third-party server storing the client data and/or cryptocurrency associated with the user, and/or broadcasting a smart contract call), the system may generate a command line on the CLI allowing the abstraction layer of the system can communicate with the third-party server. In this way, the system can provide instructions and/or requests to the third-party server without having to determine which programming language the software of the third-party server is written in. In some cases, the content of the command written in the command line interface may depend on the determined corresponding action. For example, if the corresponding action is to obtain access keys to a wallet associated with a user, the content of the command may include an address for the wallet (e.g., a hexadecimal string address) sending and/or receiving transferred funds.

In some examples, the system may connect, via an integration, to an external library associated with the cryptocurrency coin and initiate, at the command line interface, the command. For example, the external library may include a third-party server used to store new cryptocurrency, including storing private keys, cryptocurrency data, blockchain data, and/or client data associate with the organization that generated the new cryptocurrency. The system may integrate with the external library by initiating the command generated in the command line and obtaining any client data associated with the content included in the command. For example, the content in the command may be based on the corresponding action determined by the system (e.g., obtaining access keys to a wallet associated with the user in order to access the cryptocurrency to be transferred, establishing a connection with the third-party server storing the client data and/or cryptocurrency associated with the user, and/or broadcasting a smart contract call) and the content in the command may include a request to access cryptocurrency, private keys, cryptocurrency data, blockchain data, and/or client data associate with the organization that generated the new cryptocurrency and/or investors associate with the organization. In some cases, the integration with the external library may include operating the abstraction layer on top of the third-party server software such that the software of the third-party server can be utilized in a secured environment.

In some cases, the system may receive, from the external library and based at least in part on initiating the command, client data associated with at least one of the user or the cryptocurrency coin. For example, based on the content of the command used in the CLI, the system may obtain client data, such as cryptocurrency, private keys, cryptocurrency data, blockchain data, etc., stored by the external library (e.g., the third-party server). In some cases, the system may receive the client data while operating the software of the external library within and/or below the abstraction layer.

In some examples, the system may obtain access keys from the external library. For example, the system may receive a request via an API shim and the API shim may, in turn, retrieve access keys based on the information included in the request. For example, if the request includes an address for a wallet, the API shim may retrieve, from the external library, access keys that are associated with the wallet specified by the address. In some cases, the system and/or the API shim may map the access keys to a virtual machine instance associated with the system such that the access keys are applied in the appropriate manner and/or format for the external library software running in the abstraction layer. Once the access keys are obtained and applied, the API shim may call the third-party software to execute the command associate with the request (e.g., obtain client data, such as cryptocurrency, private keys, cryptocurrency data, blockchain data, etc., stored by the external library (e.g., the third-party server)).

In some examples, cryptocurrency coins may also include "tokens," which like other digital assets can represent anything from loyalty points to vouchers and IOUs to actual objects in the physical world. Tokens can also be tools, such as in-game items, for interacting with other smart contracts. A token is a "smart contract" running on top of a blockchain network (such as the Ethereum Blockchain, the Bitcoin Blockchain, the Neo Blockchain, the Stellar Blockchain, to name a few). As such, it is a set of code with an associated database.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example environment 100 for accessing client data from a third-party server. The environment may include, for example, a client device 102, host server 104, a third-party server(s) 106, and/or a virtual machine 108. Each of these components may be configured to communicate with each other, such as via a network 110.

The client devices 102 may include components such as, for example, one or more processors, one or more network interfaces, and/or memory. The memory may include components such as, for example, one or more applications. The client devices 102 may include, for example, a computing device, a mobile phone, a tablet, a laptop, and/or one or more servers. The components of the client device 102 will be described below by way of example. It should be understood that the example provided herein is illustrative, and should not be considered the exclusive example of the components of the client device 102. In examples, the applications of the client device 102 may be configured to display user interfaces, such as secure user interfaces, and to receive user input. The user input may be associated with requests for financial transactions and/or may be in response to data sent from one or more of the systems described herein.

The host server 104 (referred to as the "system" 104 in some cases) may include one or more components such as, for example, one or more processors, one or more network interfaces, and/or memory. The memory may include instructions executable by the one or more processors to perform operations discussed herein.

For example, in some cases and as illustrated as Step 1 in FIG. 1, the system 104 may receive a request from a user 112 via the client device 102 indicating an action with respect to a cryptocurrency coin, such as "Z" coin 114. In some examples, the Z coin 114 may be a newly generated cryptocurrency with a newly created blockchain environment and the user 112 may be an investor in the organization that generated the new blockchain and/or the user may be a member of the organization itself. In some examples, at the time the system 104 receives the request, private key data, cryptocurrency data (e.g., the cryptocurrency coins), blockchain data, and/or client data may be stored on the third-party server(s) 106. In some cases, the user 112 may access an application programming interface (API) and/or an API shim to send requests and/or other data to the system 104. For example, the system 104 may receive (e.g., via the API and from the user) a request for a wallet address, a request to transfer cryptocurrency (e.g., send or receive cryptocurrency), a request to generate a new wallet, and/or a request to stake cryptocurrency (e.g., broadcast a smart contract call). In some cases, the request options may include predefined options for selection by the user 112 and may present other selectable options based on which request option is selected by the user. For example, if the user selects to transfer cryptocurrency, an option may be presented to input a wallet address to be associated with the transfer.

In some examples, once the request is received from the user 112 via the client device 102, the system 104 may determine, at an abstraction layer 116, a corresponding action associated with the predefined request. For example, the abstraction layer 116 may operate on-top of third-party software 118 accessed and/or utilized by a third-party server 106. For instance, processes, such as key generation, may be performed by third-party software 118 (e.g., untrusted third-party wallet software) used to store and grant access to client data (e.g., cryptocurrency data, blockchain data, etc.). The data format of the request received from the user 112 may not be compatible with the third-party software 118 operated by the third-party server 106 that stores the data related to the request (e.g., private key data, cryptocurrency data (e.g., the cryptocurrency coins), blockchain data, client data, etc.). Using the abstraction layer 116, the system 104 can operate and/or otherwise have access to the third-party software 118 of the third-party servers 106 in a secured environment, as opposed to relying on new software to execute the user request. Without the need for extensive amounts of new software to execute the user request, the system 104 is able to execute the user request in a significantly shorter amount of time than previously disclosed systems.

In some cases, the user request may include a request for a wallet address, a request to transfer cryptocurrency (e.g., send or receive cryptocurrency), a request to generate a new wallet, and/or a request to stake cryptocurrency. The corresponding action determined at the abstraction layer 116 may be different for each type of request. For example, if the user request is to transfer cryptocurrency, then the determined corresponding action may include obtaining access keys to a wallet associated with the user 112 in order to access the cryptocurrency to be transferred. If the user request is to generate a new wallet, the corresponding action may include establishing a connection with the third-party server 106 storing the client data and/or cryptocurrency associated with the user. If the user request is to stake cryptocurrency, the corresponding action may include broadcasting a smart contract call. The corresponding actions may not be limited to those listed above and, in some cases, may be a combination of actions listed. For example, the system 104 may obtain access keys to a wallet associated with the user regardless of what the user request may include.

In some cases, the system 104 may generate a command in a command line interface (CLI) based on the corresponding action. For example, once the corresponding action is determined, (e.g., obtaining access keys to a wallet associated with the user in order to access the cryptocurrency to be transferred, establishing a connection with the third-party server storing the client data and/or cryptocurrency associated with the user, and/or broadcasting a smart contract call), the system 104 may generate a command line on the CLI such that the abstraction layer 116 of the system 104 can communicate with the third-party server 106. For example, at Step 2, the system 104 translates the user request, via the abstraction layer 116, into a third-party client command specific to the Z coin 114. In this way, the system 104 can, at Step 3, provide instructions and/or requests to the third-party server 106 without having to determine which programming language the third-party software 118 of the third-party server 106 is written in. In some cases, the content of the command written in the command line interface may depend on the determined corresponding action. For example, if the corresponding action is to obtain access keys to a wallet associated with a user, the content of the command may include an address for the wallet (e.g., a hexadecimal string address) sending and/or receiving transferred funds.

In some examples, the system 104 may connect, via an integration, to an external library associated with the cryptocurrency coin and initiate, at the command line interface, the command. For example, the external library may include the third-party server 106 used to store the Z coin 114, as well as storing private keys, cryptocurrency data, blockchain data, and/or client data associate with the organization that generated the new cryptocurrency. The system 104 may integrate with the third-party server 106 by operating the abstraction layer 116 on top of the third-party software 118 and by initiating the command generated in the command line and obtaining any client data associated with the content included in the command. For example, the content in the command may be based on the corresponding action determined by the system 104 (e.g., obtaining access keys to a wallet associated with the user 112 in order to access the cryptocurrency to be transferred, establishing a connection with the third-party server 106 storing the client data and/or cryptocurrency associated with the user, and/or broadcasting a smart contract call) and the content in the command may include a request to access cryptocurrency, private keys, cryptocurrency data, blockchain data, and/or client data associate with the organization that generated the new cryptocurrency and/or investors associate with the organization.

In some cases, the system 104 may receive, from an external library (e.g., third-party server 106), and based at least in part on initiating a command, client data associated with at least one of the user (e.g., user 112) or the cryptocurrency coin. For example, at Step 4, based on the content of the command used in the CLI, the system 104 may obtain client data, such as cryptocurrency, private keys, cryptocurrency data, blockchain data, etc., stored by the third-party server 106. In some cases, the system 104 may receive the client data while operating the software of the external library within and/or below the abstraction layer 116.

In some examples, the system 104, at Step 5, may obtain access keys from the third-party server 106. For example, the system 104 may receive a request via an API shim and the API shim may, in turn, retrieve access keys based on the information included in the request. For example, if the request includes an address for a wallet, the API shim may retrieve, from the third-party server 106, access keys that are associated with the wallet specified by the address. In some cases, the system 104 and/or the API shim may map the access keys to the virtual machine instance 108 associated with the system 104 such that the access keys are applied in the appropriate manner and/or format for the third-party software 118 software running in the abstraction layer 116. Once the access keys are obtained and applied, the API shim may call the third-party software 118 to execute the command associate with the request (e.g., obtain client data, such as cryptocurrency, private keys, cryptocurrency data, blockchain data, etc., stored by the third-party server 106.

In some cases, once the access keys are obtained, at Step 6, the system 104 may access the Z coin 114 via a blockchain 120 and at Step 7, the system 104 may transfer the Z coin 114 into the wallet 122. For example, the blockchain 120 may be a new blockchain created by the user 112 or an organization associated with the user 112 such that the user 112 was previously granted access to the blockchain 120 via the access keys. The access keys may be stored by the third-party server 106 and provided to the system 104 upon request (e.g., via the API shim). Once the access keys have been utilized (e.g., to access the blockchain 120), the system 104 may erase the keys such that the access keys are not permanently stored by the system 104.

In some cases, a machine learning model of the system 104 may be configured predict and to auto populate particular selectable options presented on a user interface accessed by the user 112. For example, the system may present selectable options (e.g., selectable options for a request for a wallet address, a request to transfer cryptocurrency (e.g., send or receive cryptocurrency), a request to generate a new wallet, and/or a request to stake cryptocurrency (e.g., broadcast a smart contract call)) for a user to input in detailing a user request. Over time, the machine learning model may learn the user's preferences based on historic inputs associated with the particular user. Predictive analytic techniques may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, and may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models.

Figure 2A:
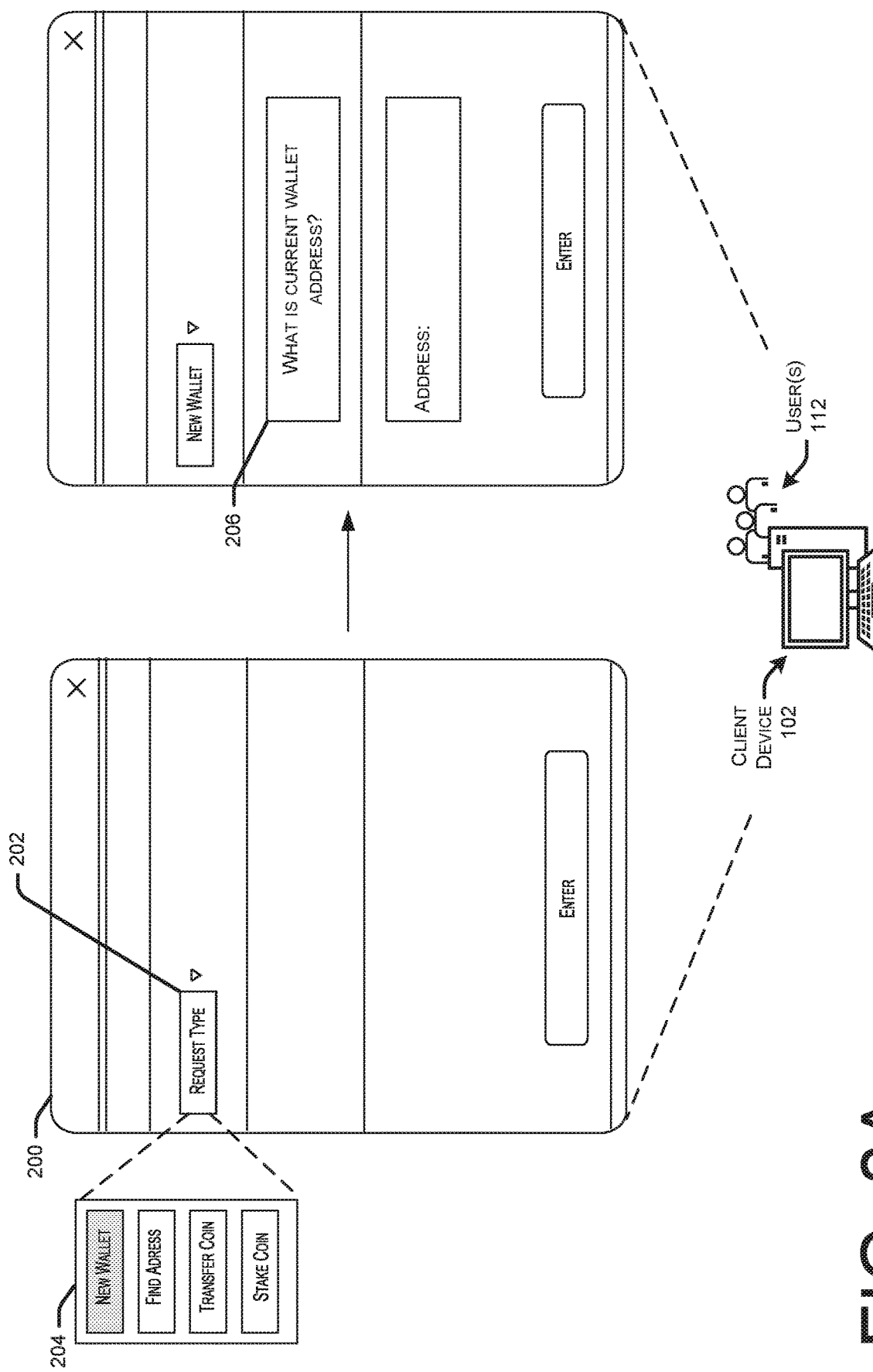
FIG. 2A illustrates an example user interface for receiving user requests associated with cryptocurrency.

FIG. 2A illustrates an example interface 200 that may be presented to a user 112 via the client device 102, to provide functionality to allow the user 112 to send user requests, such as a request for a wallet address, a request to transfer cryptocurrency (e.g., send or receive cryptocurrency), a request to generate a new wallet, and/or a request to stake cryptocurrency (e.g., broadcast a smart contract call). For example, interface 200 includes a selectable option 202 indicating an option for the user 112 to select a request type. In response to receive a selection of the selectable option 202, the interface 200 may present a number of options 204 that are selectable by the user to indicate an action with respect to a cryptocurrency (e.g., Z coin 114). As listed in FIG. 2A, the list of options 204 may include "New Wallet," "Find Address," "Transfer Coin," and/or "Stake Coin." Although only four options are listed, it is to be understood that any number of options may be listed that may indicate an action that can be taken in association with a cryptocurrency.

In some examples, in response to the user selecting one of the selectable options 204, the interface may present further options based on which of the selectable options 204 was selected. For instance, in response to selecting "New Wallet" (e.g., receiving an indication that the user requested action is to generate a new wallet), the system 104 may cause the interface 200 to present additional information, such as, a request 206 for a wallet address at which the cryptocurrency is currently stored. The system 104 can subsequently use this information (e.g., via the abstraction layer 116 to translate and generate a command for the third-party server and/or the wallet in which the cryptocurrency is currently stored.

Figure 2B:
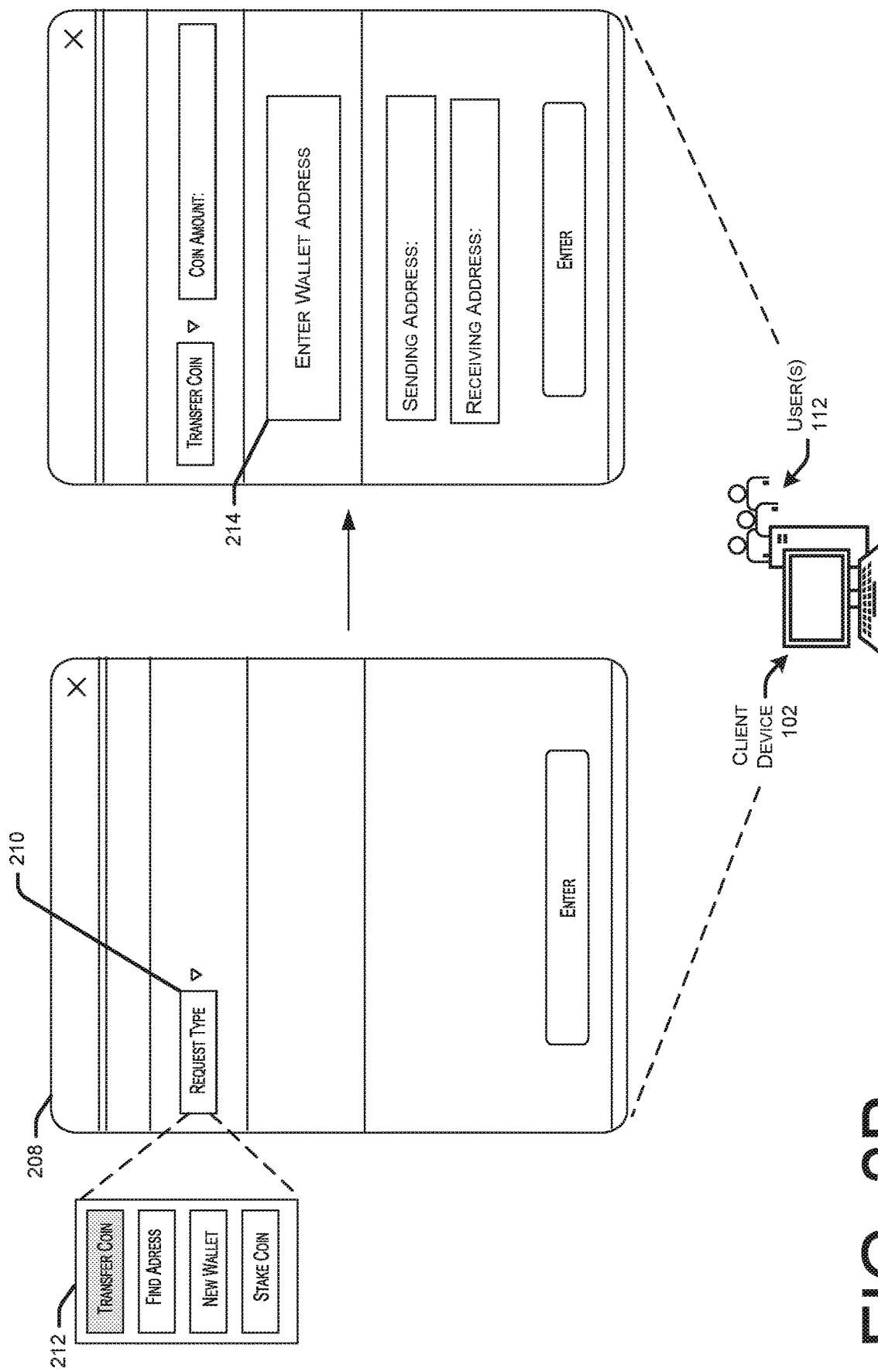
FIG. 2B illustrates another example user interface for receiving user requests associated with cryptocurrency.

FIG. 2B illustrates another example interface 20 that may be presented to a user 112 via the client device 102, to provide functionality to allow the user 112 to send user requests, such as a request for a wallet address, a request to transfer cryptocurrency (e.g., send or receive cryptocurrency), a request to generate a new wallet, and/or a request to stake cryptocurrency (e.g., broadcast a smart contract call). For example, interface 208 includes a selectable option 210 indicating an option for the user 112 to select a request type. In response to receive a selection of the selectable option 210, the interface 208 may present a number of options 212 that are selectable by the user to indicate an action with respect to a cryptocurrency (e.g., Z coin 114). As listed in FIG. 2B, the list of options 212 may include "New Wallet," "Find Address," "Transfer Coin," and/or "Stake Coin." Although only four options are listed, it is to be understood that any number of options may be listed that may indicate an action that can be taken in association with a cryptocurrency.

In some examples, in response to the user selecting one of the selectable options 212, the interface may present further options based on which of the selectable options 212 was selected. For instance, in response to selecting "Transfer Coin" (e.g., a request to transfer cryptocurrency (e.g., send or receive cryptocurrency), the system 104 may cause the interface 208 to present additional information, such as, a request 214 for a wallet address associated with the wallet to receive the cryptocurrency (e.g., "receiving address") and a wallet address associated with the wallet sending the cryptocurrency (e.g., "sending address"). The system 104 can subsequently use this information (e.g., via the abstraction layer 116 to translate and generate a command for the third-party server and/or the wallet in which the cryptocurrency is currently stored.

Figure 3:
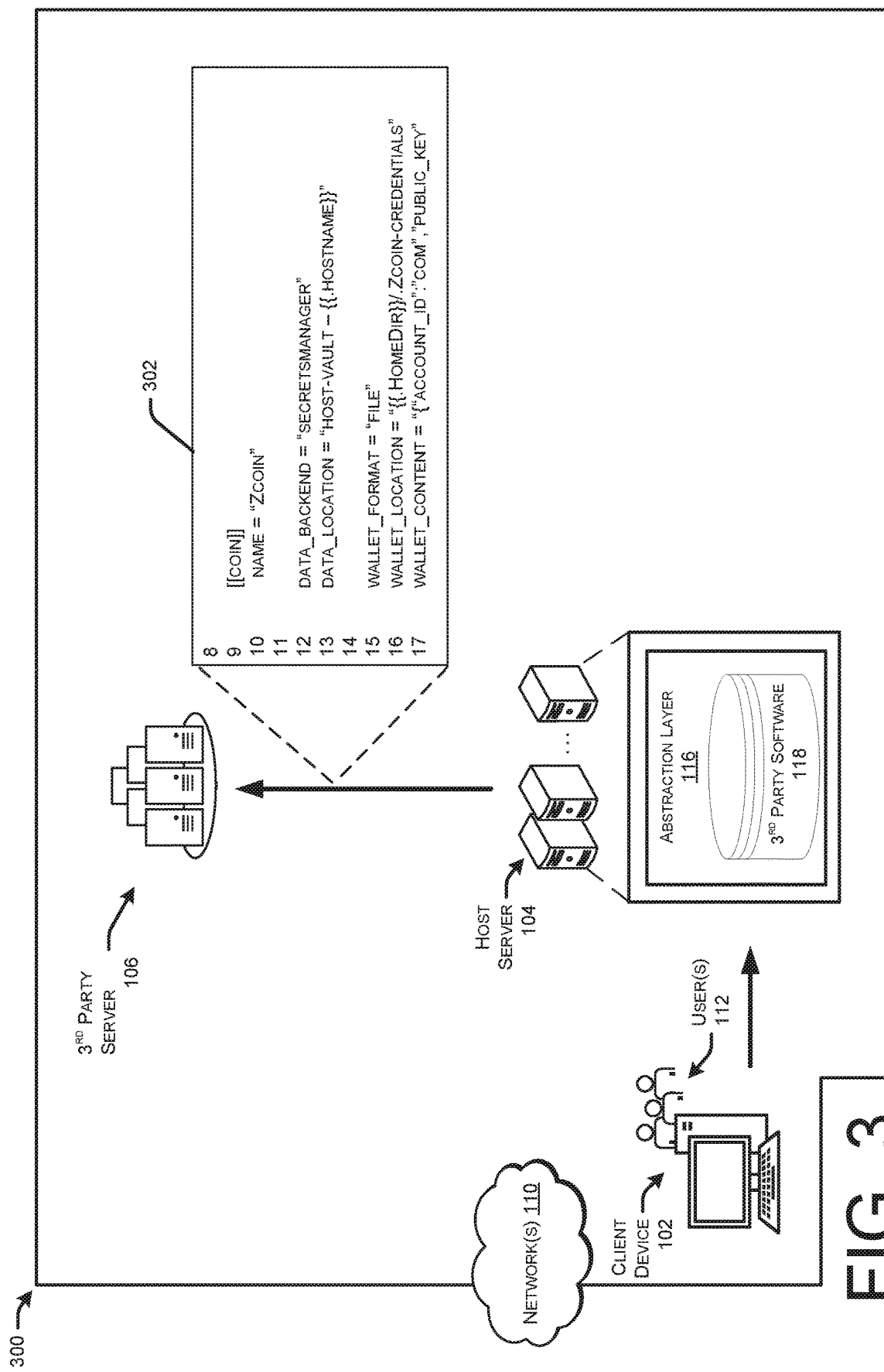
FIG. 3 illustrates a schematic diagram of an example environment for accessing client data from a third-party server.

FIG. 3 illustrates a schematic diagram of an example environment 300 for accessing client data from a third-party server. The environment 300 may be the same or similar to the environment 100 and include for example, the client device 102, the host server 104, a third-party server(s) 106, the abstraction layer 116, and the third-party software 118. Each of these components may be configured to communicate with each other, such as via the network 110.

In some cases, the system 104 may generate a command in a CLI 302 based on corresponding action determined from a user request. For example, once the corresponding action is determined, (e.g., obtaining access keys to a wallet associated with the user in order to access the cryptocurrency to be transferred, establishing a connection with the third-party server storing the client data and/or cryptocurrency associated with the user, and/or broadcasting a smart contract call), the system 104 may generate a command line on the CLI 302 such that the abstraction layer 116 of the system 104 can communicate with the third-party server 106. For example, at Step 2, the system 104 translates the user request, via the abstraction layer 116, into a third-party client command specific to the Z coin 114. In this way, the system 104 can provide instructions and/or requests to the third-party server 106 without having to determine which programming language the third-party software 118 of the third-party server 106 is written in. In some cases, the content of the command written in the command line interface may depend on the determined corresponding action. For example, if the corresponding action is to obtain access keys to a wallet associated with a user, the content of the command may include an address for the wallet (e.g., a hexadecimal string address) sending and/or receiving transferred funds.

FIGS. 4-7 illustrate various processes for accessing client data from a third-party server. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the block's need be executed. For discussion purposes, the processes are described with reference to the environments, architectures and systems described in the examples herein, such as, for example those described with respect to FIGS. 1-3, although the processes may be implemented in a wide variety of other environments, architectures and systems.

Figure 4:
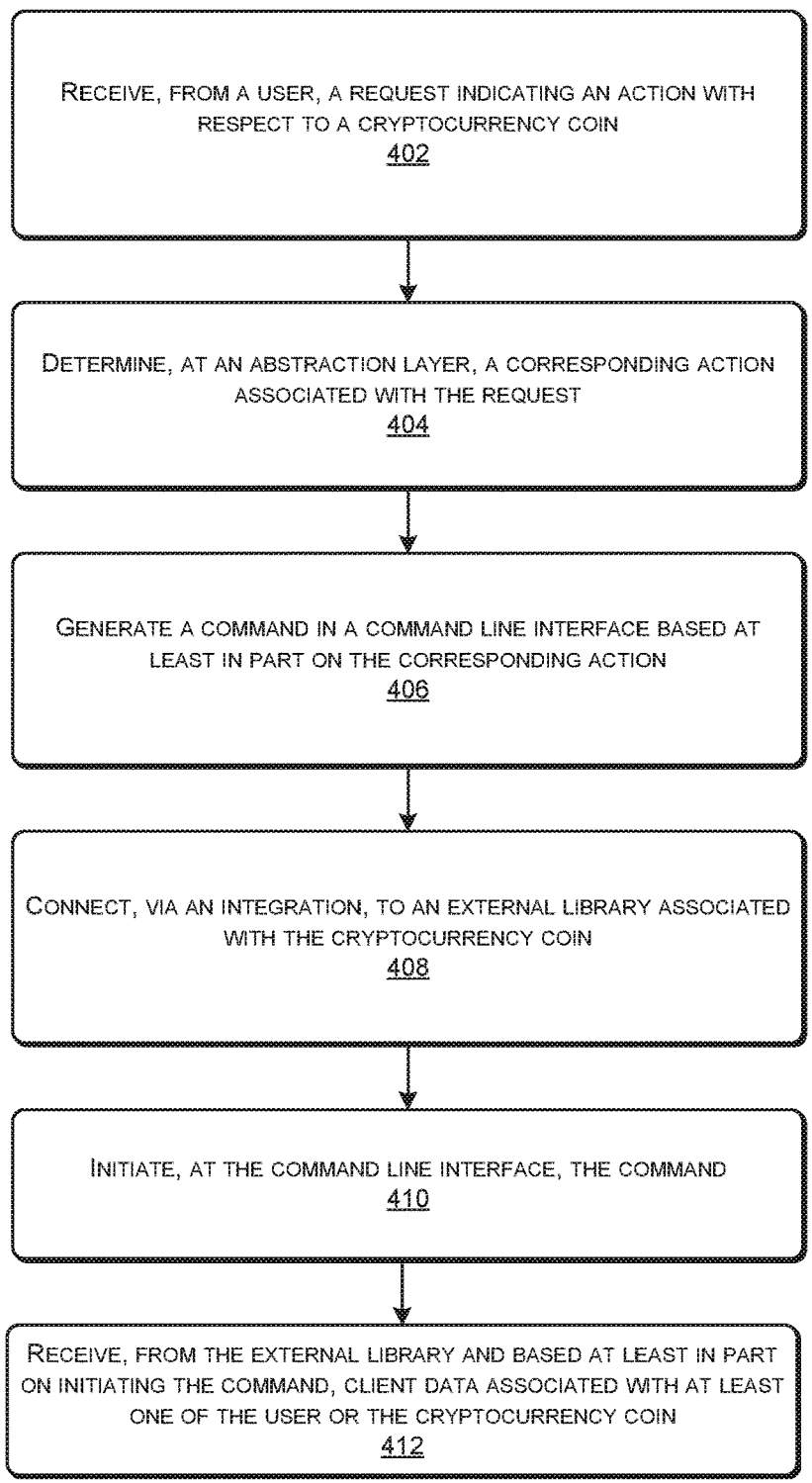
FIG. 4 illustrates a flow diagram of an example process for accessing client data as described herein.

FIG. 4 illustrates a flow diagram of an example process 400 for accessing client data from a third-party server. The order in which the operations or steps are described is not intended to be construed as a limitation, and any number of the described operations may be combined in any order and/or in parallel to implement process 400.

At block 402, the process 400 may include receiving a request from a user via the client device indicating an action with respect to a cryptocurrency coin. In some examples, the Z coin 114 may be a newly generated cryptocurrency with a newly created blockchain environment and the user 112 may be an investor in the organization that generated the new blockchain and/or the user may be a member of the organization itself. In some examples, at the time the system 104 receives the request, private key data, cryptocurrency data (e.g., the cryptocurrency coins), blockchain data, and/or client data may be stored on the third-party server(s) 106. In some cases, the user 112 may access an application programming interface (API) and/or an API shim to send requests and/or other data to the system 104. For example, the system 104 may receive (e.g., via the API and from the user) a request for a wallet address, a request to transfer cryptocurrency (e.g., send or receive cryptocurrency), a request to generate a new wallet, and/or a request to stake cryptocurrency (e.g., broadcast a smart contract call). In some cases, the request options may include predefined options for selection by the user 112 and may present other selectable options based on which request option is selected by the user. For example, if the user selects to transfer cryptocurrency, an option may be presented to input a wallet address to be associated with the transfer.

At block 404, the process 400 may include determining, at an abstraction layer, a corresponding action associated with the request. For example, the abstraction layer 116 may operate on-top of third-party software 118 accessed and/or utilized by a third-party server 106. For instance, processes, such as key generation, may be performed by third-party software 118 (e.g., untrusted third-party wallet software) used to store and grant access to client data (e.g., cryptocurrency data, blockchain data, etc.). The data format of the request received from the user 112 may not be compatible with the third-party software 118 operated by the third-party server 106 that stores the data related to the request (e.g., private key data, cryptocurrency data (e.g., the cryptocurrency coins), blockchain data, client data, etc.). Using the abstraction layer 116, the system 104 can operate and/or otherwise have access to the third-party software 118 of the third-party servers 106 in a secured environment, as opposed to relying on new software to execute the user request. Without the need for extensive amounts of new software to execute the user request, the system 104 is able to execute the user request in a significantly shorter amount of time than previously disclosed systems.

In some cases, the user request may include a request for a wallet address, a request to transfer cryptocurrency (e.g., send or receive cryptocurrency), a request to generate a new wallet, and/or a request to stake cryptocurrency. The corresponding action determined at the abstraction layer 116 may be different for each type of request. For example, if the user request is to transfer cryptocurrency, then the determined corresponding action may include obtaining access keys to a wallet associated with the user 112 in order to access the cryptocurrency to be transferred. If the user request is to generate a new wallet, the corresponding action may include establishing a connection with the third-party server 106 storing the client data and/or cryptocurrency associated with the user. If the user request is to stake cryptocurrency, the corresponding action may include broadcasting a smart contract call. The corresponding actions may not be limited to those listed above and, in some cases, may be a combination of actions listed. For example, the system 104 may obtain access keys to a wallet associated with the user regardless of what the user request may include.

At block 406, the process 400 may include generating a command in a command line interface (CLI) based on the corresponding action. For example, once the corresponding action is determined, (e.g., obtaining access keys to a wallet associated with the user in order to access the cryptocurrency to be transferred, establishing a connection with the third-party server storing the client data and/or cryptocurrency associated with the user, and/or broadcasting a smart contract call), the system 104 may generate a command line on the CLI such that the abstraction layer 116 of the system 104 can communicate with the third-party server 106. For example, at Step 2, the system 104 translates the user request, via the abstraction layer 116, into a third-party client command specific to the Z coin 114. In this way, the system 104 can, at Step 3, provide instructions and/or requests to the third-party server 106 without having to determine which programming language the third-party software 118 of the third-party server 106 is written in. In some cases, the content of the command written in the command line interface may depend on the determined corresponding action. For example, if the corresponding action is to obtain access keys to a wallet associated with a user, the content of the command may include an address for the wallet (e.g., a hexadecimal string address) sending and/or receiving transferred funds.

At block 408, the process 400 may include connecting, via an integration, to an external library associated with the cryptocurrency coin and at block 410 the process 400 may include initiating, at the command line interface, the command. For example, the external library may include the third-party server 106 used to store the Z coin 114, as well as storing private keys, cryptocurrency data, blockchain data, and/or client data associate with the organization that generated the new cryptocurrency. The system 104 may integrate with the third-party server 106 by operating the abstraction layer 116 on top of the third-party software 118 and by initiating the command generated in the command line and obtaining any client data associated with the content included in the command. For example, the content in the command may be based on the corresponding action determined by the system 104 (e.g., obtaining access keys to a wallet associated with the user 112 in order to access the cryptocurrency to be transferred, establishing a connection with the third-party server 106 storing the client data and/or cryptocurrency associated with the user, and/or broadcasting a smart contract call) and the content in the command may include a request to access cryptocurrency, private keys, cryptocurrency data, blockchain data, and/or client data associate with the organization that generated the new cryptocurrency and/or investors associate with the organization.

At block 412, the process 400 may include receiving, from an external library, and based at least in part on initiating a command, client data associated with at least one of the user (e.g., user 112) or the cryptocurrency coin. For example, at Step 4, based on the content of the command used in the CLI, the system 104 may obtain client data, such as cryptocurrency, private keys, cryptocurrency data, blockchain data, etc., stored by the third-party server 106. In some cases, the system 104 may receive the client data while operating the software of the external library within and/or below the abstraction layer 116.

Additionally and/or alternatively, the process 400 includes requests including at least one of checking addresses, transferring coins, creating wallets, or staking coins.

Additionally and/or alternatively, the process 400 may include authenticating a connection and retrieving, at a server, access keys.

Additionally and/or alternatively, the process 400 may include requesting, at the server, a location of the access keys, parsing an index, storing, via a web service, the access keys, and erasing, from the web service, the access keys, wherein erasing, from the web service, the access keys is performed after initiating the predefined request.

Additionally and/or alternatively, the process 400 may include authenticating the connection further comprises: determining, at a firewall, a list of predefined requests, comparing the list of predefined requests to the predefined request by the user, allowing, based at least in part on the predefined request by the user matching an entry in the list of predefined requests, the predefined request by the user, and denying, based at least in part on the predefined request by the user not matching an entry in the list of predefined requests, the predefined request by the user.

Additionally and/or alternatively, the process 400 may include retrieving, at the server, access keys includes an API shim configured to fetch, import, and remove the access keys.

Additionally and/or alternatively, the process 400 may include receiving, at the API shim, a request, retrieving the access keys, mapping the access keys to a virtual machine instance, configuring access keys to appropriate format for external software associated with the specific coin, calling the external software, and removing, from the virtual machine instance, the access keys.

Additionally and/or alternatively, the process 400 may include the integration including at least one of an API and an interface.

FIG. 5 illustrates a flow diagram of an example process 500 for accessing client data from a third-party server. The order in which the operations or steps are described is not intended to be construed as a limitation, and any number of the described operations may be combined in any order and/or in parallel to implement process 500.

At block 502, the process 500 may include receiving a request to store cryptocurrency data on a first server. In some examples, the Z coin 114 may be a newly generated cryptocurrency with a newly created blockchain environment and the user 112 may be an investor in the organization that generated the new blockchain and/or the user may be a member of the organization itself. In some examples, at the time the system 104 receives the request, private key data, cryptocurrency data (e.g., the cryptocurrency coins), blockchain data, and/or client data may be stored on the third-party server(s) 106. In some cases, the user 112 may access an application programming interface (API) and/or an API shim to send requests and/or other data to the system 104. For example, the system 104 may receive (e.g., via the API and from the user) a request for a wallet address, a request to transfer cryptocurrency (e.g., send or receive cryptocurrency), a request to generate a new wallet, and/or a request to stake cryptocurrency (e.g., broadcast a smart contract call). In some cases, the request options may include predefined options for selection by the user 112 and may present other selectable options based on which request option is selected by the user. For example, if the user selects to transfer cryptocurrency, an option may be presented to input a wallet address to be associated with the transfer.

At block 504, the process 500 may include determining, at an abstraction layer, a corresponding action associated with the request. For example, the abstraction layer 116 may operate on-top of third-party software 118 accessed and/or utilized by a third-party server 106. For instance, processes, such as key generation, may be performed by third-party software 118 (e.g., untrusted third-party wallet software) used to store and grant access to client data (e.g., cryptocurrency data, blockchain data, etc.). The data format of the request received from the user 112 may not be compatible with the third-party software 118 operated by the third-party server 106 that stores the data related to the request (e.g., private key data, cryptocurrency data (e.g., the cryptocurrency coins), blockchain data, client data, etc.). Using the abstraction layer 116, the system 104 can operate and/or otherwise have access to the third-party software 118 of the third-party servers 106 in a secured environment, as opposed to relying on new software to execute the user request. Without the need for extensive amounts of new software to execute the user request, the system 104 is able to execute the user request in a significantly shorter amount of time than previously disclosed systems.

In some cases, the user request may include a request for a wallet address, a request to transfer cryptocurrency (e.g., send or receive cryptocurrency), a request to generate a new wallet, and/or a request to stake cryptocurrency. The corresponding action determined at the abstraction layer 116 may be different for each type of request. For example, if the user request is to transfer cryptocurrency, then the determined corresponding action may include obtaining access keys to a wallet associated with the user 112 in order to access the cryptocurrency to be transferred. If the user request is to generate a new wallet, the corresponding action may include establishing a connection with the third-party server 106 storing the client data and/or cryptocurrency associated with the user. If the user request is to stake cryptocurrency, the corresponding action may include broadcasting a smart contract call. The corresponding actions may not be limited to those listed above and, in some cases, may be a combination of actions listed. For example, the system 104 may obtain access keys to a wallet associated with the user regardless of what the user request may include.

At block 506, the process 500 may include generating a command in a command line interface (CLI) based on the corresponding action. For example, once the corresponding action is determined, (e.g., obtaining access keys to a wallet associated with the user in order to access the cryptocurrency to be transferred, establishing a connection with the third-party server storing the client data and/or cryptocurrency associated with the user, and/or broadcasting a smart contract call), the system 104 may generate a command line on the CLI such that the abstraction layer 116 of the system 104 can communicate with the third-party server 106. For example, at Step 2, the system 104 translates the user request, via the abstraction layer 116, into a third-party client command specific to the Z coin 114. In this way, the system 104 can, at Step 3, provide instructions and/or requests to the third-party server 106 without having to determine which programming language the third-party software 118 of the third-party server 106 is written in. In some cases, the content of the command written in the command line interface may depend on the determined corresponding action. For example, if the corresponding action is to obtain access keys to a wallet associated with a user, the content of the command may include an address for the wallet (e.g., a hexadecimal string address) sending and/or receiving transferred funds.

At block 508, the process 500 may include connecting, via an integration, to a second server with the cryptocurrency coin and at block 510 the process 500 may include initiating, at the command line interface, the command. For example, the external library may include the third-party server 106 used to store the Z coin 114, as well as storing private keys, cryptocurrency data, blockchain data, and/or client data associate with the organization that generated the new cryptocurrency. The system 104 may integrate with the third-party server 106 by operating the abstraction layer 116 on top of the third-party software 118 and by initiating the command generated in the command line and obtaining any client data associated with the content included in the command. For example, the content in the command may be based on the corresponding action determined by the system 104 (e.g., obtaining access keys to a wallet associated with the user 112 in order to access the cryptocurrency to be transferred, establishing a connection with the third-party server 106 storing the client data and/or cryptocurrency associated with the user, and/or broadcasting a smart contract call) and the content in the command may include a request to access cryptocurrency, private keys, cryptocurrency data, blockchain data, and/or client data associate with the organization that generated the new cryptocurrency and/or investors associate with the organization.

At block 512, the process 500 may include receiving, from the second server, and based at least in part on initiating a command, client data associated with at least one of the user (e.g., user 112) or the cryptocurrency coin. For example, at Step 4, based on the content of the command used in the CLI, the system 104 may obtain client data, such as cryptocurrency, private keys, cryptocurrency data, blockchain data, etc., stored by the third-party server 106. In some cases, the system 104 may receive the client data while operating the software of the external library within and/or below the abstraction layer 116.

Figure 6:
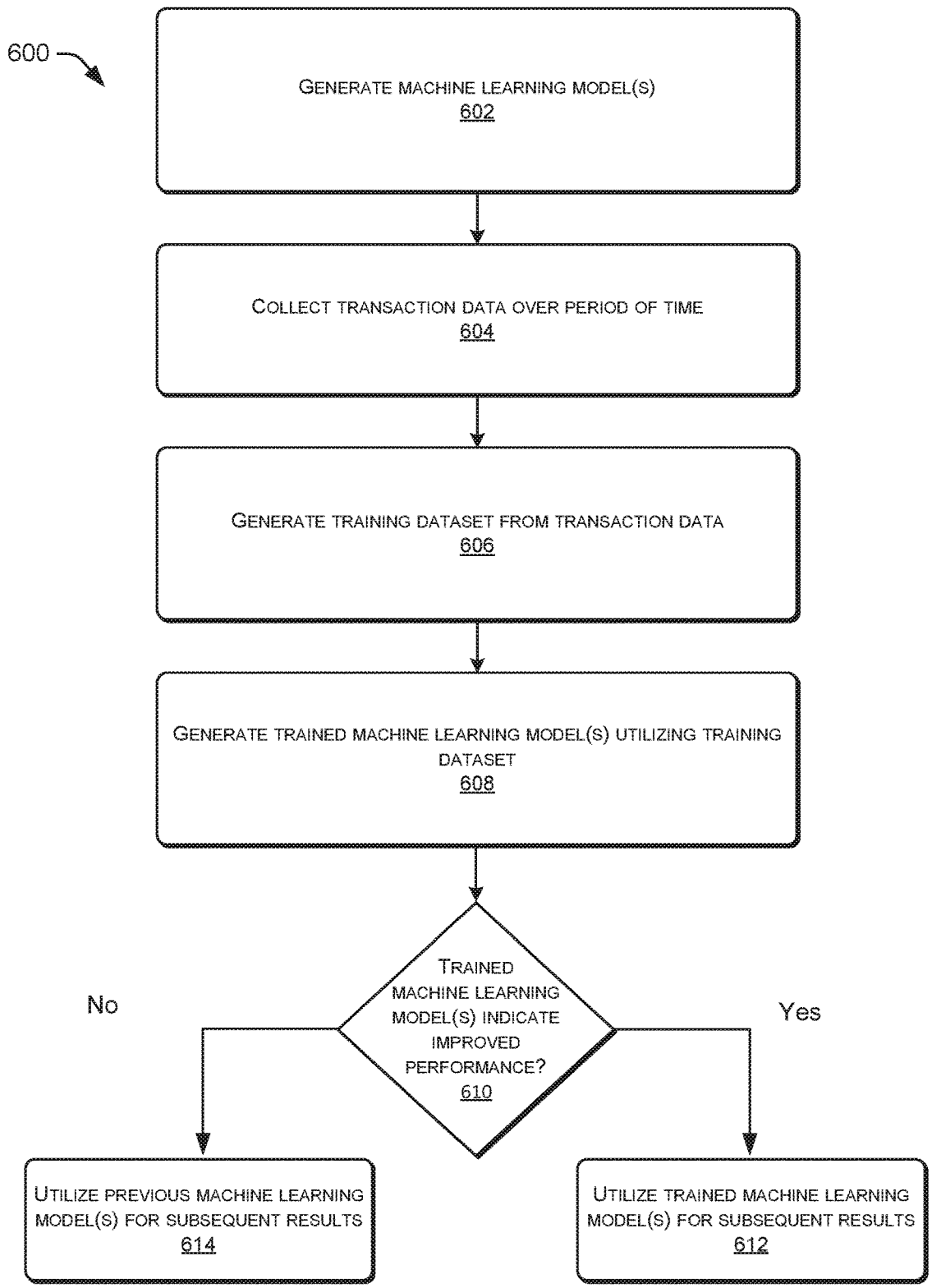
FIG. 6 illustrates a flow diagram of an example process for training and utilizing one or more machine learning models to perform operations as described herein.

FIG. 6 illustrates a flow diagram of an example process 600 for training and utilizing one or more machine learning models to perform operations as described herein. The order in which the operations or steps are described is not intended to be construed as a limitation, and any number of the described operations may be combined in any order and/or in parallel to implement process 600.

At block 602, the process 600 may include generating one or more machine learning models. For example, the machine learning models may utilize predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, and may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models.

At block 604, the process 600 may include collecting transaction data over a period of time. The transaction data may include information associated with payment card transactions, reward amounts, user preferences, settlement amounts, reward amounts in a reward queue, pre-funded wallet metrics, cryptocurrency exchange occurrence and/or rates, metrics on automatic deposits into the exchange platform, metrics on automatic deposits into user wallets, cryptocurrency type selections, earning amounts, and/or any other data described herein.

At block 606, the process 600 may include generating a training dataset from the transaction data. Generation of the training dataset may include formatting the transaction data into input vectors for the machine learning model to intake, as well as associating the various data with the transaction outcomes.

At block 608, the process 600 may include generating one or more trained machine learning models utilizing the training dataset. Generation of the trained machine learning models may include updating parameters and/or weightings and/or thresholds utilized by the models to generate recommendations and/or to perform adjustments of earning amounts as described herein. It should be understood that the trained machine learning models may be configured to determine factors for recommendations associated with adjusted earning amounts, cryptocurrency types, whether to deposit rewards into an exchange platform, products to purchase, payment instruments to use, etc.

At block 610, the process 600 may include determining whether the trained machine learning models indicate improved performance metrics. For example, a testing group may be generated where the outcomes of the recommendations and/or adjustments are known but not to the trained machine learning models. The trained machine learning models may generate the recommendations and/or perform the adjustment operations, which may be compared to the known results to determine whether the results of the trained machine learning model produce a superior result than the results of the machine learning model prior to training.

In examples where the trained machine learning models indicate improved performance metrics, the process 600 may include, at block 612, utilizing the trained machine learning models for generating subsequent results.

In examples where the trained machine learning models do not indicate improved performance metrics, the process 600 may include, at block 614, utilizing the previous iteration of the machine learning models for generating subsequent results. It should be understood that while several examples of how machine learning models may be utilized are described in FIG. 6, the machine learning models may be utilized to perform any of the processes described herein and/or to make any of the determinations described herein.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

Figure 7:
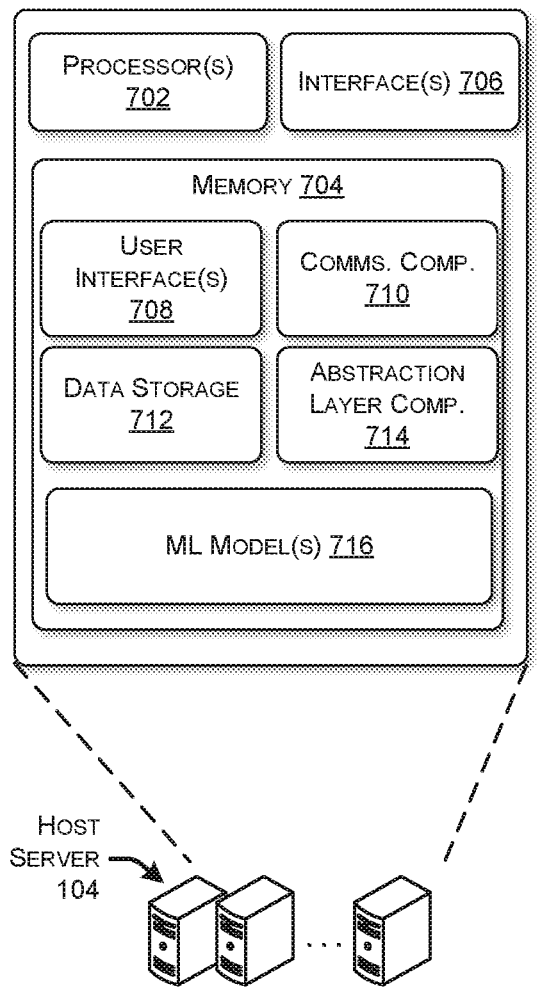
FIG. 7 illustrates a schematic diagram of a host server having one or more components.

FIG. 7 is a schematic diagram of an example host server 104 (e.g., the system 104) and several of the components of the system 104 and/or the other systems and devices, and the associated functionality of those components as described herein.

As used herein, a processor, such as processor(s) 702, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 702 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 702 may possess its own local memory, which also may store program components, program data, and/or one or more operating systems.

The memory 704 may include volatile and nonvolatile memory, removable and non-removable media implemented in any method or technology for storage of information, such as computer-readable instructions, data structures, program component, or other data. Such memory 704 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information, and which can be accessed by a computing device. The memory 704 may be implemented as computer-readable storage media ("CRSM"), which may be any available physical media accessible by the processor(s) 702 to execute instructions stored on the memory 704. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information, and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 704, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 706 may enable messages between the components and/or devices shown in the environment 100 and/or with one or more other remote systems, as well as other networked devices. Such network interface (s) 706 may include one or more network interface controllers (NICs) or other types of transceiver devices to send and receive messages over the network 110.

For instance, each of the network interface(s) 706 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 706 may include a wide area network (WAN) component to enable message over a wide area network. In some examples, the network interfaces may be usable to generate a user interface, such as user interface 708, presentable via the client device 102. In this case, the user interface 708 shows a number of selectable options enabling the user to generate a user request.

In some examples, the memory 704 may include a communications component 710 of the system 104 that may be configured to generate connections with the client device 102 and third-party server 106. The communications component 710 may establish and authenticate a number of communication connections with the client device 102 and/ or the third-party server 106 and enable communication between the system 104 the client device 102 and/or the third-party server 106 the network 110.

In some examples, the memory 704 may include a data storage 712, used to store data associated with the clients 112 and/or any client data associated with the clients 112. For example, the data storage 712 may authentication information (e.g., username, password, identification information) used by the system 104 to authenticate a user and enable the user 112 access to the system 104.

In some examples, the memory 704 may include an abstraction layer component 714, used by the system 104 to access third-party software. For example, the abstraction layer component 714 may operate on-top of any software accessed and/or utilized by a third-party server. For instance, processes, such as key generation, may be performed by third-party software (e.g., untrusted third-party wallet software) used to store and grant access to client data (e.g., cryptocurrency data, blockchain data, etc.). The data format of the request received from the user may not be compatible with the software operated by the third-party server that stores the data related to the request (e.g., private key data, cryptocurrency data (e.g., the cryptocurrency coins), blockchain data, client data, etc.). Using the abstraction layer component 714, the system can operate and/or otherwise have access to the software of the third-party servers in a secured environment, as opposed to relying on new software to execute the user request. Without the need for extensive amounts of new software to execute the user request, the system is able to execute the user request in a significantly shorter amount of time than previously disclosed systems.

In some cases, the memory 704 may include one or more machine learning models 716. For example, the machine learning model(s) 716 of the system 104 may be configured predict and to auto populate particular selectable options presented on a user interface accessed by the user 112. For example, the system may present selectable options (e.g., selectable options for a request for a wallet address, a request to transfer cryptocurrency (e.g., send or receive cryptocurrency), a request to generate a new wallet, and/or a request to stake cryptocurrency (e.g., broadcast a smart contract call)) for a user to input in detailing a user request. Over time, the machine learning model(s) 716 may learn the user's preferences based on historic inputs associated with the particular user. Predictive analytic techniques may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

What is claimed is:

1. A method comprising:
   receiving, from a user, a predefined request indicating an action with respect to a cryptocurrency coin, the predefined request including at least one of checking addresses, transferring coins, creating wallets, or staking coins;
   determining, at an abstraction layer, a corresponding action associated with the predefined request, wherein the abstraction layer is configured to operate software associated with an external library without additional source code being written;
   generating a command in a command line interface based at least in part on the corresponding action;
   connecting, via an integration, to the external library associated with the cryptocurrency coin;
   initiating, at the command line interface, the command; and
   receiving, from the external library and based at least in part on initiating the command, client data associated with at least one of the user or the cryptocurrency coin.

2. The method of claim 1, wherein the predefined request includes creating at least one new wallet.

3. The method of claim 1, further comprising:
authenticating a connection; and
retrieving, at a server, access keys.

4. The method of claim 3, wherein retrieving, at the server, access keys further comprises:
requesting, at the server, a location of the access keys;
parsing an index,
storing, via a web service, the access keys; and
erasing, from the web service, the access keys,
wherein erasing, from the web service, the access keys is performed after initiating the predefined request.

5. The method of claim 3, wherein authenticating the connection further comprises:
determining, at a firewall, a list of predefined requests;
comparing the list of predefined requests to the predefined request by the user,
allowing, based at least in part on the predefined request by the user matching an entry in the list of predefined requests, the predefined request by the user; and
denying, based at least in part on the predefined request by the user not matching an entry in the list of predefined requests, the predefined request by the user.

6. The method of claim 3, wherein retrieving, at the server, access keys includes an API shim configured to fetch, import, and remove the access keys.

7. The method of claim 6, further comprising:
receiving, at the API shim, a request;
retrieving the access keys;
mapping the access keys to a virtual machine instance;
configuring access keys to appropriate format for external software associated with the cryptocurrency coin;
calling the external software; and removing, from the virtual machine instance, the access keys.

8. The method of claim 1, wherein the integration includes at least one of an API and an interface.

9. A system comprising:
one or more processors; and
memory including instructions executable by the one or more processors to perform operations comprising:
receiving, from a user, a predefined request indicating an action with respect to a cryptocurrency coin;
determining, at an abstraction layer, a corresponding action associated with the predefined request, wherein the abstraction layer is configured to operate software associated with an external library without additional source code being written;
generating a command in a command line interface based at least in part on the corresponding action;
connecting, via an integration, to the external library associated with the cryptocurrency coin;
initiating, at the command line interface, the command; and
receiving, from the external library and based at least in part on initiating the command, client data associated with at least one of the user or the cryptocurrency coin.

10. The system of claim 9, wherein the predefined request includes at least one of checking addresses, transferring coins, creating wallets, and broadcasting smart contract calls.

11. The system of claim 9, further comprising:
authenticating a connection; and
retrieving, at a server, access keys.

12. The system of claim 11, wherein retrieving, at the server, access keys further comprises:
requesting, at the server, a location of the access keys;
parsing an index,
storing, via a web service, the access keys; and
erasing, from the web service, the access keys, wherein erasing, from the web service, the access keys is performed after initiating the predefined request.

13. The system of claim 11, wherein authenticating the connection further comprises:
determining, at a firewall, a list of predefined requests;
comparing the list of predefined requests to the predefined request by the user,
allowing, based at least in part on the predefined request by the user matching an entry in the list of predefined requests, the predefined request by the user; and
denying, based at least in part on the predefined request by the user not matching an entry in the list of predefined requests, the predefined request by the user.

14. The system of claim 11, wherein retrieving, at the server, access keys includes an API shim configured to fetch, import, and remove the access keys.

15. The system of claim 14, further comprising:
receiving, at the API shim, a request;
retrieving the access keys;
mapping the access keys to a virtual machine instance;
configuring access keys to appropriate format for external software associated with the cryptocurrency coin;
calling the external software; and removing, from the virtual machine instance, the access keys.

16. The system of claim 9, wherein the integration includes at least one of an API and an interface.

\* \* \* \* \*